(12) United States Patent
Sato et al.

(10) Patent No.: US 11,618,074 B2
(45) Date of Patent: Apr. 4, 2023

(54) METHOD OF MANUFACTURING METAL MEMBER

(71) Applicant: IHI Corporation, Tokyo (JP)

(72) Inventors: Akihiro Sato, Tokyo (JP); Tomomichi Ozaki, Tokyo (JP)

(73) Assignee: IHI Corporation, Tokyo (JP)

( * ) Notice: Subject to any disclaimer, the term of this patent is extended or adjusted under 35 U.S.C. 154(b) by 352 days.

(21) Appl. No.: 16/848,497

(22) Filed: Apr. 14, 2020

(65) Prior Publication Data
US 2020/0384538 A1    Dec. 10, 2020

Related U.S. Application Data

(63) Continuation of application No. PCT/JP2018/040245, filed on Oct. 30, 2018.

(30) Foreign Application Priority Data

Oct. 31, 2017   (JP) .............................. JP2017-211003

(51) Int. Cl.
*B22F 3/15* (2006.01)
*B29C 64/153* (2017.01)
(Continued)

(52) U.S. Cl.
CPC ................ *B22F 3/15* (2013.01); *B22F 5/04* (2013.01); *B29C 64/153* (2017.08);
(Continued)

(58) Field of Classification Search
CPC ...... F01D 5/147; F01D 5/28; F05D 2300/605; F05D 2300/607; F05D 2230/22;
(Continued)

(56) References Cited

U.S. PATENT DOCUMENTS 5,640,667 A    6/1997  Freitag et al.
10,329,918 B2*  6/2019  Slavens .................. F01D 5/188
(Continued)

FOREIGN PATENT DOCUMENTS

CN    105705278 A    6/2016
CN    105935774 A    9/2016
(Continued)

OTHER PUBLICATIONS

Chinese Office Action dated Jul. 16, 2021 for Chinese Patent Application No. 201880069285.0.
(Continued)

*Primary Examiner* — Moshe Wilensky
(74) *Attorney, Agent, or Firm* — Volpe Koenig (57) ABSTRACT

A method of manufacturing a metal member including a first part and a second part includes a first fabrication process of fabricating the first part through a three-dimensional metal stack fabrication by a powder bed method, and a second fabrication process of fabricating an outer circumference of the second part through the three-dimensional metal stack fabrication by the powder bed method, and then sintering metallic powder remaining in an inner portion of the second part by hot isostatic pressing so as to fabricate the second part.

4 Claims, 5 Drawing Sheets

(51) Int. Cl.
*B22F 5/04* (2006.01)
*B33Y 10/00* (2015.01)
*B33Y 80/00* (2015.01)
*B29L 31/08* (2006.01)

(52) U.S. Cl.
CPC .......... *B29L 2031/08* (2013.01); *B33Y 10/00* (2014.12); *B33Y 80/00* (2014.12)

(58) Field of Classification Search
CPC ............ F05D 2230/31; F05D 2230/42; B22F 2998/10; B22F 3/1258; B22F 10/20; B22F 10/28; B22F 3/15; B22F 5/04; B33Y 40/20; B33Y 10/00; B33Y 80/00; B29L 2031/08; B29C 64/153
See application file for complete search history.

(56) References Cited

U.S. PATENT DOCUMENTS

| | | | |
|---|---|---|---|
| 11,305,353 B2* | 4/2022 | Geisen | B22F 10/40 |
| 2010/0007062 A1 | 1/2010 | Larsson et al. | |
| 2013/0280092 A1 | 10/2013 | Xu | |
| 2014/0163717 A1 | 6/2014 | Das et al. | |
| 2015/0283614 A1 | 10/2015 | Wu et al. | |
| 2016/0258298 A1 | 9/2016 | Channel et al. | |
| 2016/0273074 A1 | 9/2016 | Smarsly et al. | |
| 2016/0273368 A1 | 9/2016 | Smarsly et al. | |
| 2016/0288266 A1 | 10/2016 | Rockstroh et al. | |
| 2017/0189966 A1 | 7/2017 | Giannozzi et al. | |
| 2017/0260865 A1 | 9/2017 | Schloffer | |
| 2017/0260997 A1 | 9/2017 | Mola et al. | |
| 2019/0128137 A1* | 5/2019 | Wesling | F02C 3/067 |
| 2020/0298341 A1 | 9/2020 | Rockstroh et al. | |

FOREIGN PATENT DOCUMENTS

| | | |
|---|---|---|
| CN | 106660122 A | 5/2017 |
| CN | 107027298 A | 8/2017 |
| DE | 102015216802 A1 | 3/2017 |
| EP | 2995398 A2 | 3/2016 |
| EP | 3064295 A1 | 9/2016 |
| EP | 3069803 A1 | 9/2016 |
| EP | 3072611 A3 | 10/2016 |
| JP | 2000-517375 A | 12/2000 |
| JP | 2009-544501 A | 12/2009 |
| JP | 1422008 B2 | 2/2010 |
| JP | 2015-161031 A | 9/2015 |
| JP | 2016-502603 A | 1/2016 |
| JP | 2016-502615 A | 1/2016 |
| JP | 2017-519106 A | 7/2017 |
| WO | 2014/052323 A1 | 4/2014 |

OTHER PUBLICATIONS

Das et al., "Direct laser freeform fabrication of high performance metal components", Rapid Prototyping Journal, vol. 4 No. 3, pp. 112-117(1998).
Chinese Office Action dated Jan. 12, 2022 for Chinese Patent Application No. 201880069285.0.
Extended European Search Report dated Aug. 14, 2020 for the European Patent Application No. 18873929.6.
Nomura, Y., et al., "Research and Development on Customized Anisotropic Components for Aerospace and Energy Systems," Materia Japan, vol. 54, No. 10, pp. 511-512 (2015).

* cited by examiner

METHOD OF MANUFACTURING METAL MEMBER

CROSS REFERENCE TO RELATED APPLICATIONS

This application is a continuation application of International Application No. PCT/JP2018/040245, filed on Oct. 30, 2018, which claims priority to Japanese Patent Application No. 2017-211003, filed on Oct. 31, 2017, the entire contents of which are incorporated by reference herein.

BACKGROUND

1. Technical Field

The present disclosure relates to a method of manufacturing a metal member.

2. Description of the Related Art

Metal members used as components in various types of industrial devices need to have properties conforming to the conditions during use. A metal member, when required to entirely have uniform properties, may be manufactured by a conventional method so as to exhibit the corresponding properties. For example, a metal member required to have creep properties can be manufactured by typical precision casting so as to lead a metallic structure to a uni-directional solidified structure or a single crystal structure.

A metal member may be required to have several properties varying depending on the parts included. For example, a metal member, when presumed to include a first part and a second part, may need to have creep properties mainly in the first part, and fatigue properties mainly in the second part. The first part of the metal member preferably has a metallic structure which is either a uni-directional solidified structure or a single crystal structure, while the second part preferably has a metallic structure which is an isometric structure. If this metal member required to have the two different properties is manufactured by typical precision casting d, the uni-directional solidification or the single crystallization proceeds toward the second part, which impedes the manufacture of the metal member having preferable properties.

Various three-dimensional fabrication methods have been used for manufacturing metal members. Japanese Translation of PCT International Application Publication No. 2009-544501 (Patent Literature 1) discloses a three-dimensional stack fabrication device and method for producing a three-dimensional product by use of powder material which can be solidified by irradiation with a high-energy beam. The use of this three-dimensional fabrication device, instead of typical precision casting, can manufacture a metal member having different structures that varies depending on parts.

SUMMARY

The three-dimensional stack fabrication disclosed in Patent Literature 1 may lead to a greater gradient of temperature in the fabrication direction, which tends to cause crystals to be elongated in the uni-direction (the fabrication direction) in the metallic structure formed. It is thus difficult to prepare a part particularly having an isometric structure, even though the metal member may have different structures varying in the respective parts. Namely, the three-dimensional stack fabrication disclosed in Patent Literature 1 has a problem of manufacturing a metal member having desirable properties depending on parts.

An object of the present disclosure is to provide a method of manufacturing a metal member having different metallic structures varying depending on parts so as to conform to the corresponding properties required.

A method of manufacturing a metal member including a first part and a second part according to a first aspect of the present disclosure includes a first fabrication process of fabricating the first part through a three-dimensional metal stack fabrication by a powder bed method, and a second fabrication process of fabricating an outer circumference of the second part through the three-dimensional metal stack fabrication by the powder bed method, and then sintering metallic powder remaining in an inner portion of the second part by hot isostatic pressing so as to fabricate the second part.

A method of manufacturing a metal member including a first part and a second part according to a second aspect of the present disclosure includes a three-dimensional fabrication process of fabricating the first part and an outer circumference of the second part through a three-dimensional metal stack fabrication by a powder bed method, and a processing process of sintering metallic powder remaining in an inner portion of the second part by hot isostatic pressing after the three-dimensional fabrication process.

DESCRIPTION OF THE EMBODIMENTS

Hereinafter, exemplary embodiments of the present disclosure will be described with reference to the drawings. The following dimensions, materials, and specific numerical values described in the embodiments are shown for illustration purposes, and the present disclosure is not intended to be limited thereto unless otherwise specified. The elements having substantially the same functions and structures are designated by the same reference numerals, and overlapping explanations are not repeated below. The elements described below but not related directly to the present disclosure are not shown in the drawings.

Figure 1:
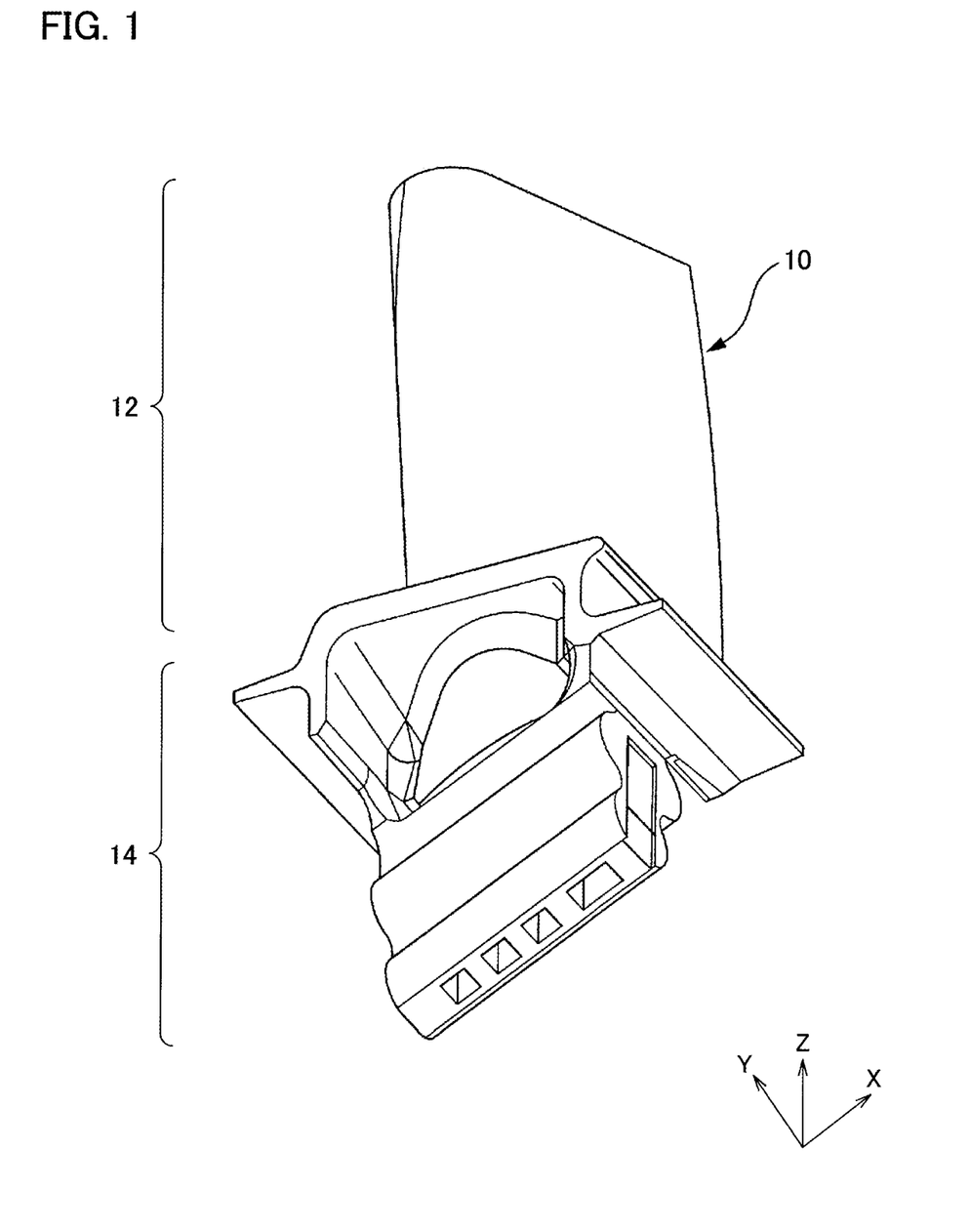
FIG. 1 is a view showing a turbine blade which can be manufactured by a manufacturing method according to an embodiment of the present disclosure.

FIG. 1 is a perspective view showing a turbine blade 10 as an example of a metal member to be manufactured by a manufacturing method according to the present embodiment. The turbine blade 10 is an element of turbine components used for an aircraft jet engine or an industrial gas turbine, for example, and a plurality of turbine blades are provided at the outer circumference of a turbine rotor (not shown). The turbine blade 10 includes a blade portion 12 as a first part and a dovetail portion 14 as a second part. The dovetail portion is referred to also as a blade base portion. The blade portion 12 is a part for guiding gas at a high pressure or a high temperature. The dovetail portion 14 is a part preliminarily fitted in a groove provided on the turbine rotor so as to fix the turbine blade 10 to the turbine rotor. A material used for the turbine blade 10 is a Ni-based superalloy, for example. In the following explanations of the drawings, a Z-axis is defined as an extending direction of the turbine blade 10, and an X-axis and a Y-axis perpendicular to the X-axis are each defined on the horizontal plane perpendicular to the Z-axis.

A metal member typically has material properties which depend on its metallic structure (crystal structure). A uni-directional solidified structure or a single crystal structure, for example, has a relatively small amount of crystal grains in a stress-generated direction. The metal member in which the metallic structure is either the uni-directional solidified structure or the single crystal structure thus has high creep properties. An isometric structure, for example, is a fine structure including fine crystal grains. The metal member in which the metallic structure is the isometric structure thus has high tensile strength or fatigue strength.

As for the respective parts of the turbine blade 10, the blade portion 12 particularly needs to have the creep properties. The material used for the blade portion 12 thus preferably has the uni-directional solidified structure or the single crystal structure. The dovetail portion 14 particularly needs to have the fatigue properties. The material used for the dovetail portion 14 thus preferably has the isometric structure. The present embodiment employing the following manufacturing method manufactures the turbine blade 10 having different metallic structures depending on the parts so as to ensure the respective required properties.

The method of manufacturing the turbine blade 10 according to the present embodiment first fabricates the entire blade portion 12 and the outer circumference of the dovetail portion 14 in the turbine blade 10 by a three-dimensional metal stack fabrication. The three-dimensional metal stack fabrication is herein referred to also as a three-dimensional fabrication for short.

Figure 2:
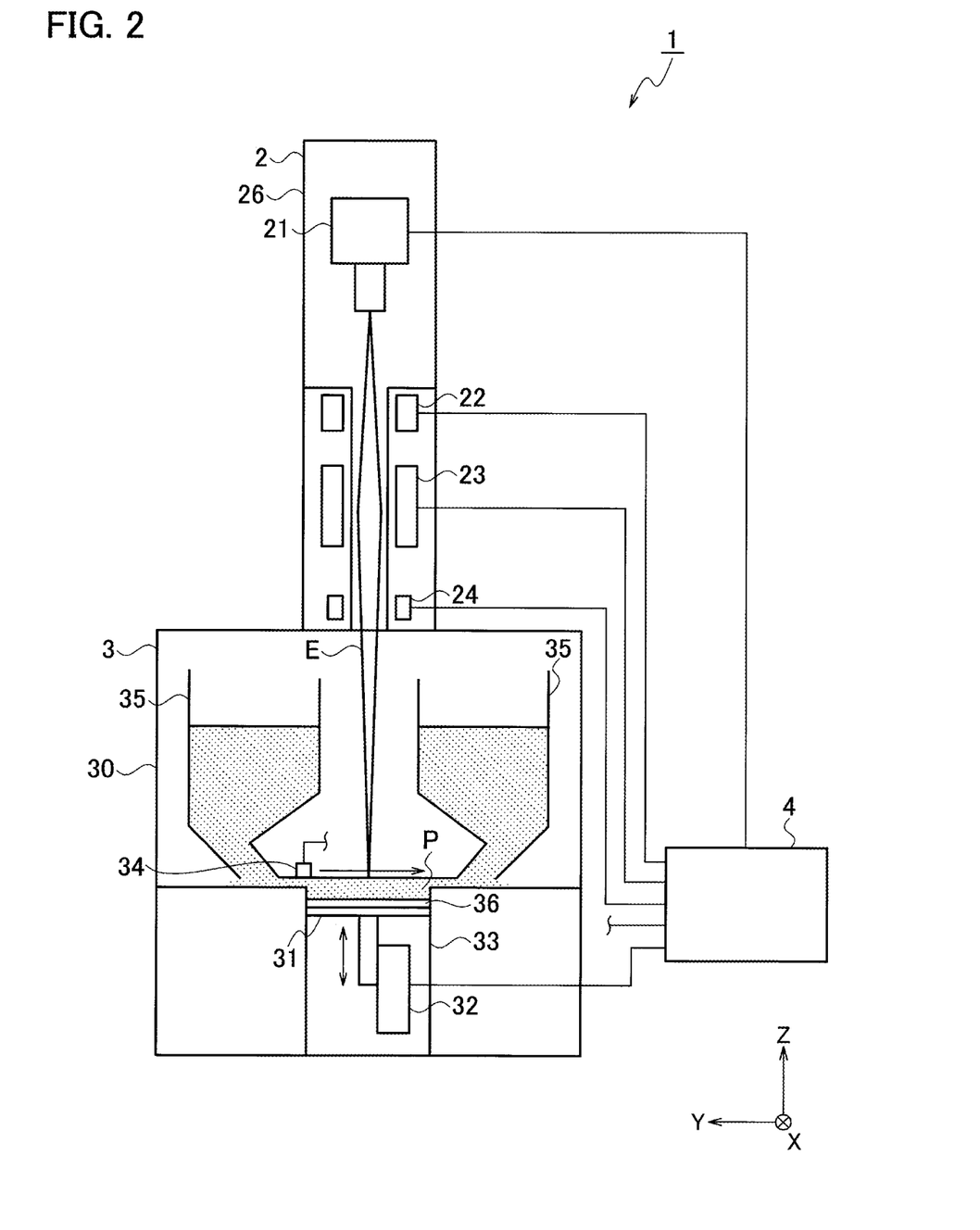
FIG. 2 is a view showing a structure of a three-dimensional metal stack fabrication device.

FIG. 2 is a schematic cross-sectional view illustrating a structure of a three-dimensional fabrication device 1 used for the manufacturing method according to the present embodiment. The three-dimensional fabrication device 1 employs a powder bed method of irradiating powder material P with the electron beam E to be melted and solidified, and repeatedly stacking the solidified powder material P so as to fabricate a three-dimensional object. The powder material P used in the present embodiment is metallic powder material, and includes various kinds of powder body. The powder material P may be any granular material that can be melted and solidified by irradiation with the electron beam E, and may have a larger granular diameter than powder.

The powder material P may further be irradiated with the electron beam E before each fabrication processing of fusing and solidifying the powder material P for each layer so as to preliminarily heat the powder material P. The provisional heating is referred to also as preheating for heating the powder material P at a temperature below a fusing point of the powder material P. The provisional heating subjects the powder material P to heating and preliminary sintering to suppress negative charge accumulation on the powder material P due to the irradiation with electron beam E, so as to avoid a smoke phenomenon by the powder material P scattered and blown up upon the irradiation with the electron beam E.

The three-dimensional fabrication device 1 includes a beam emission unit 2, a fabrication unit 3, and a control unit 4.

The beam emission unit 2 irradiates the powder material P in the fabrication unit 3 with the electron beam E so as to fuse the powder material P. The electron beam E is a charged particle beam obtained by a straight movement of electrons as charged particles. The beam emission unit 2 includes an electron gun unit 21, an aberration coil 22, a focus coil 23, a deflection coil 24, and a column 25.

The electron gun unit 21 emits the electron beam E to the fabrication unit 3. The electron gun unit 21 is electrically connected to the control unit 4 so as to operate when receiving a control signal from the control unit 4.

The aberration coil 22 is arranged close to the electron beam E to be emitted from the electron gun unit 21, and corrects aberrations of the electron beam E. The aberration coil 22 is electrically connected to the control unit 4 so as to operate when receiving a control signal from the control unit 4. The arrangement of the aberration coil 22 is sometimes omitted depending on the type of the three-dimensional fabrication device 1 used.

The focus coil 23 is arranged close to the electron beam E to be emitted from the electron gun unit 21, and converges the electron beam E to regulate a focused state of the electron beam E at the irradiated position. The focus coil 23 is electrically connected to the control unit 4 so as to operate when receiving a control signal from the control unit 4.

The deflection coil 24 is arranged close to the electron beam E to be emitted from the electron gun unit 21, and adjusts the irradiated position of the electron beam E in accordance with a control signal. The deflection coil 24 electromagnetically deflects the electron beam, so as to increase a scanning speed during the irradiation of the electron beam E, as compared with a case of mechanically performing the beam deflection. The deflection coil 24 is electrically connected to the control unit 4 so as to operate when receiving the control signal from the control unit 4.

The column 25 is a cylinder-shaped casing, for example. The column 25 houses the electron gun unit 21, the aberration coil 22, the focus coil 23, and the deflection coil 24.

The fabrication unit 3 fabricates the metal member into a preferred shape. The fabrication unit 3 includes a chamber 30, a stage 31, an elevator 32, a fabrication tank 33, a recoater 34, and a hopper 35.

The chamber 30 is a box-shaped casing, for example. The chamber 30 houses the stage 31, the elevator 32, the recoater 34, and the hopper 35. The chamber 30 is connected to the column 25 of the beam emission unit 2. The inner space of the chamber 30 communicates with the inner space of the column 25 in which the electron gun unit 21 is installed. The inner space of the chamber 30 is kept in a vacuum or substantially a vacuum state.

The stage 31 supports the metal member to be fabricated. The stage 31 is located on the extension of the electron beam E in the irradiation direction, and is a disk-like member having a main surface which is a horizontal surface, for example. The stage 31 is arranged in the fabrication tank 33 movably in the Z-axis direction. A base plate 36 is placed on the surface of the stage 31. The powder material P is directly supplied to the base plate 36.

The elevator 32 is a mechanism for lifting up and moving down the stage 31. The elevator 32 is electrically connected to the control unit 4 so as to operate when receiving a control signal from the control unit 4. For example, the elevator 32 preliminarily moves the stage 31 upward in the beginning of the fabrication of the metal member, and moves down the stage 31 every time the powder material P is melted and solidified to be stacked on the stage 31. The elevator 32 may be any kind of mechanism that can lift up and move down the stage 31.

The fabrication tank 33 is a cylinder-shaped container having an inner wall conforming to the outline of the stage 31. The present embodiment is illustrated with the case in which the stage 31 has a disk-like shape, and the fabrication tank 33 thus has a cylindrical shape with the inner wall concentric in cross section with the axis of the stage 31 along the moving direction. This configuration can avoid a downward leakage of the powder material P supplied to the fabrication tank 33 from the stage 31. A seal member may be provided along the outer edge of the stage 31 so as to further suppress the downward leakage of the powder material P. The fabrication tank 33 is not limited to the cylindrical shape, and may have a prismatic shape with a rectangular shape in cross section.

The recoater 34 is a powder application mechanism for supplying the powder material P over the stage 31 and smoothing the surface of the powder material P. The recoater 34 is a stick-like or plate-like member, for example. As indicated by the arrow shown in FIG. 2, the recoater 34 moves in the horizontal direction to supply the powder material P in the region irradiated with the electron beam E and smooth the surface of the powder material P. The movement of the recoater 34 is regulated by an actuator (not shown), for example. Another mechanism for smoothing the powder material P may be used instead of the recoater 34.

The hopper 35 is a container for storing the powder material P before being applied. The hopper 35 has a discharge port 35a at a lower part for discharging the powder material P. The powder material P discharged from the discharge port 35a directly flows to the stage 31, or is supplied to the stage 31 by the recoater 34. Another mechanism for supplying the powder material P to the stage 31 in layers may be used instead of the recoater 34 or the hopper 35.

The control unit 4 controls the operating states and the like of the entire three-dimensional fabrication device 1. The control unit 4 includes a computer including a CPU, a ROM, or RAM, for example. The control unit 4 controls the upward/downward movement of the stage 31, the operation of the recoater 34, the irradiation of the electron beam E, and the operation of the deflection coil 24, for example.

The control unit 4 executes the fabrication by use of three-dimensional computer-aided design (CAD) data of the metal member to be fabricated. The three-dimensional CAD data is shape data of the metal member preliminarily input to the control unit 4. The control unit 4 generates two-dimensional slice data based on the three-dimensional CAD data. The slice data is horizontal cross-sectional data on the metal member to be fabricated, and is an aggregate of a large volume of data corresponding to the respective layers in the stacking direction. The control unit 4 determines the region of the powder material P to be irradiated with the electron beam E based on the slice data, and outputs the control signal to the deflection coil 24 according to the region determined. The region corresponding to the shape of the metal member is thus irradiated with the electron beam E. The control unit 4 also outputs the control signal to the deflection coil 24 of the beam emission unit 2 when subjecting the powder material P to the provisional heating, so as to scan and irradiate the heating region on the stage 31 with the electron beam E.

Next, a three-dimensional fabrication process using the three-dimensional fabrication device 1 is described below.

Figure 3A:
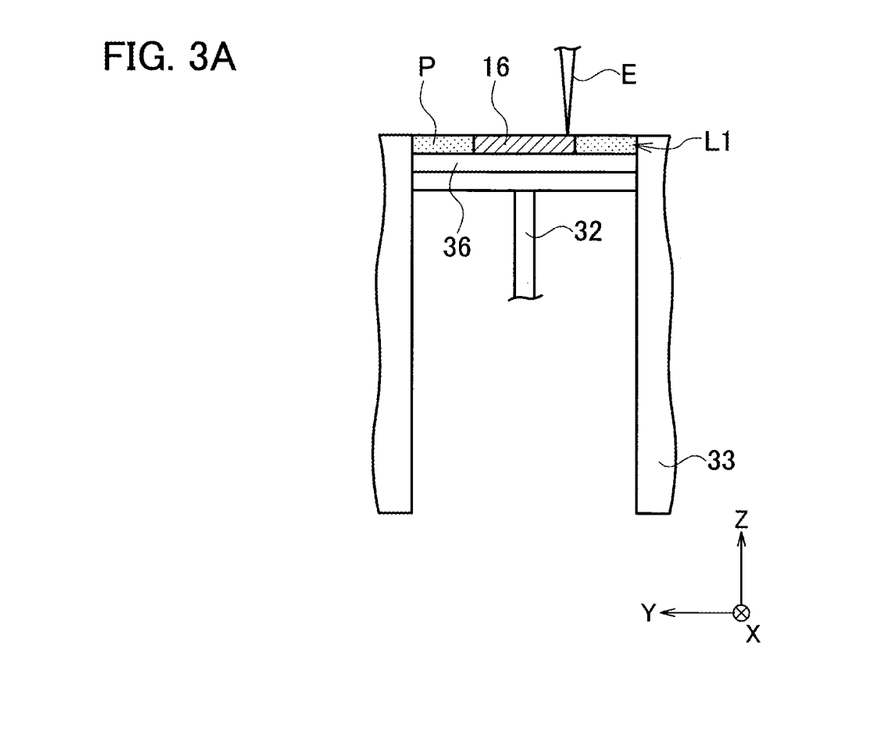
FIG. 3A is a view showing a step of fabricating a lowermost layer in a three-dimensional metal stack fabrication process.
Figure 3B:
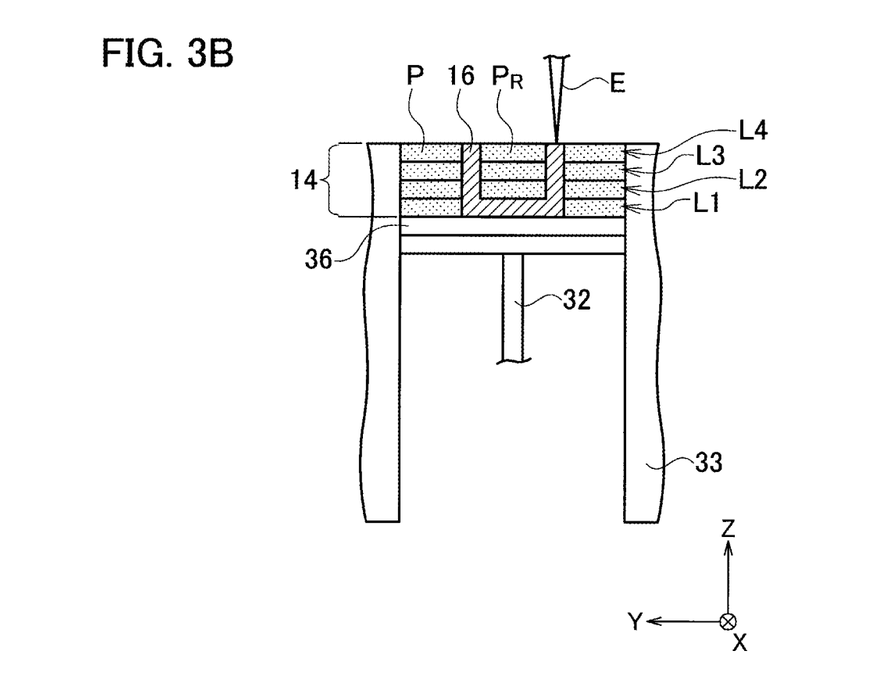
FIG. 3B is a view showing a step of fabricating a dovetail portion in the three-dimensional metal stack fabrication process.
Figure 3C:
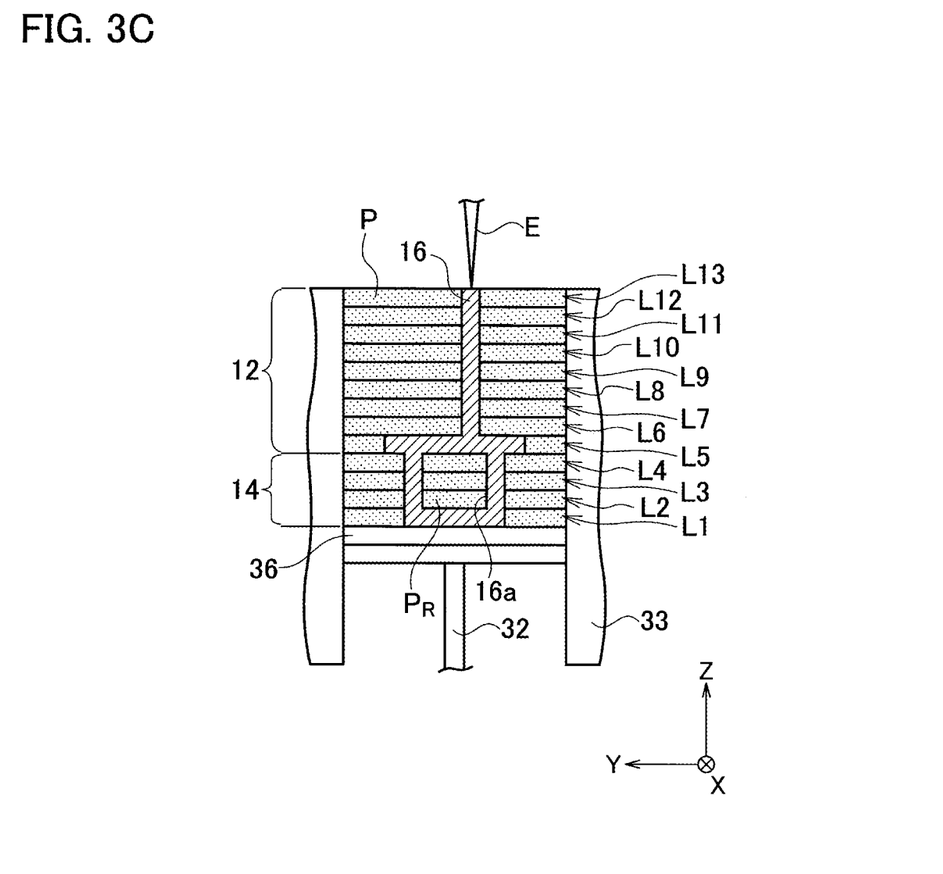
FIG. 3C is a view showing a step of fabricating a blade portion in the three-dimensional metal stack fabrication process.

FIG. 3A to FIG. 3C are schematic cross-sectional time-series views illustrating the three-dimensional fabrication process for fabricating an intermediate product 16 of the turbine blade 10 by the three-dimensional fabrication device 1. The three-dimensional fabrication process irradiates the powder material P on the base plate 36 with the electron beam E and repeats the fabrication of part of the intermediate product 16 so as to fabricate the intermediate product 16 in a layered state. FIG. 3A to FIG. 3C and FIG. 4 described below illustrate the intermediate product 16 with a simplified shape substantially corresponding to the shape of the turbine blade 10.

The three-dimensional fabrication process fabricates the intermediate product 16 starting from the part corresponding to the dovetail portion 14 of the turbine blade 10, followed by the part corresponding to the blade portion 12 of the turbine blade 10. When the extending direction of the turbine blade 10 is defined as the Z-axis, as shown in FIG. 1, the stacking direction in the three-dimensional fabrication process corresponds to the Z direction.

First, the fabrication of the intermediate product 16 at the first layer L1 which is the lowermost layer is described with reference to FIG. 3A. The three-dimensional fabrication device 1 performs the powder supply processing. The powder supply processing is a step of supplying the powder material P to the base plate 36 and smoothing the surface of the supplied powder material P. In particular, the control unit 4 outputs the control signal to the elevator 32 to adjust the vertical position of the stage 31, and outputs the control signal to the actuator (not shown) or the other mechanism to operate the recoater 34. The recoater 34 then moves in the horizontal direction so as to supply the powder material P to the stage 31 and smooth the surface of the supplied powder material P.

The three-dimensional fabrication device 1 may perform the provisional heating processing before the following fabrication processing. In particular, the control unit 4 outputs the control signal to the beam emission unit 2 to cause the electron gun unit 21 to emit the electron beam E, while causing the electron beam E to make a scan as appropriate. The powder material P on the base plate 36 is thus irradiated and heated evenly with the electron beam E.

The three-dimensional fabrication device 1 then performs the fabrication processing. The fabrication processing is a step of actually fabricating the intermediate product 16. In particular, the control unit 4 generates the two-dimensional slice data based on the three-dimensional CAD data of the intermediate product 16 to be fabricated. The control unit 4 determines the region of the powder material P to be irradiated with the electron beam E based on the slice data, and causes the beam emission unit 2 to emit the electron beam E in accordance with the region determined. This fabrication processing fabricates part of the layers composing the intermediate product 16. For example, as shown in FIG. 3A, the bottom included in the dovetail portion 14 of the intermediate product 16 is formed at the first layer L1.

The three-dimensional fabrication device 1 repeats the series of the steps from the powder supply processing to the fabrication processing described above for the respective layers on the first layer L1, so as to gradually form the intermediate product 16 in layers. The intermediate product 16 is finally fabricated into a preferred shape, as shown in FIG. 3C.

According to the present embodiment, only the outer circumference of the part corresponding to the dovetail portion 14 of the intermediate product 16 is densely fabricated, as shown in FIG. 3B. While FIG. 3B and FIG. 3C illustrate the part corresponding to the dovetail portion 14 composed of the four layers from the first layer L1 to the fourth layer L4, the number of the layers may be determined as appropriate. The inner portion of the part corresponding to the dovetail portion 14 obtained as described above still remains the powdery state. The powder material remaining in the inner region 16a of the part corresponding to the dovetail portion 14 shown in FIG. 3B and FIG. 3C is indicated by the reference sign $P_R$. The inner region 16a is a sealed region with the six surfaces surrounded by the outer circumference and the like fabricated by the fabrication processing. The powder material $P_R$ is thus enclosed in the sealed region. As used herein, the term "powdery state" encompasses a state in which the powder material P is not bonded together, a state in which the powder material P is subjected to provisional heating, and a state in which the powder material P is merely in a preliminarily-sintered state before being melted. The term "preliminarily-sintered state" is a state in which the powder material P is dispersed and bonded at the minimum points due to dispersion phenomenon.

The part corresponding to the blade portion 12 of the intermediate product 16 is entirely densely fabricated, as shown in FIG. 3C. The part corresponding to the blade portion 12 shown in FIG. 3C is presumed to be composed of nine layers from the fifth layer L5 to the thirteenth layer L13 which is the uppermost layer.

The method of manufacturing the turbine blade 10 according to the present embodiment then subjects the intermediate product 16 fabricated by the three-dimensional fabrication process to hot isostatic pressing (HIP).

Figure 4:
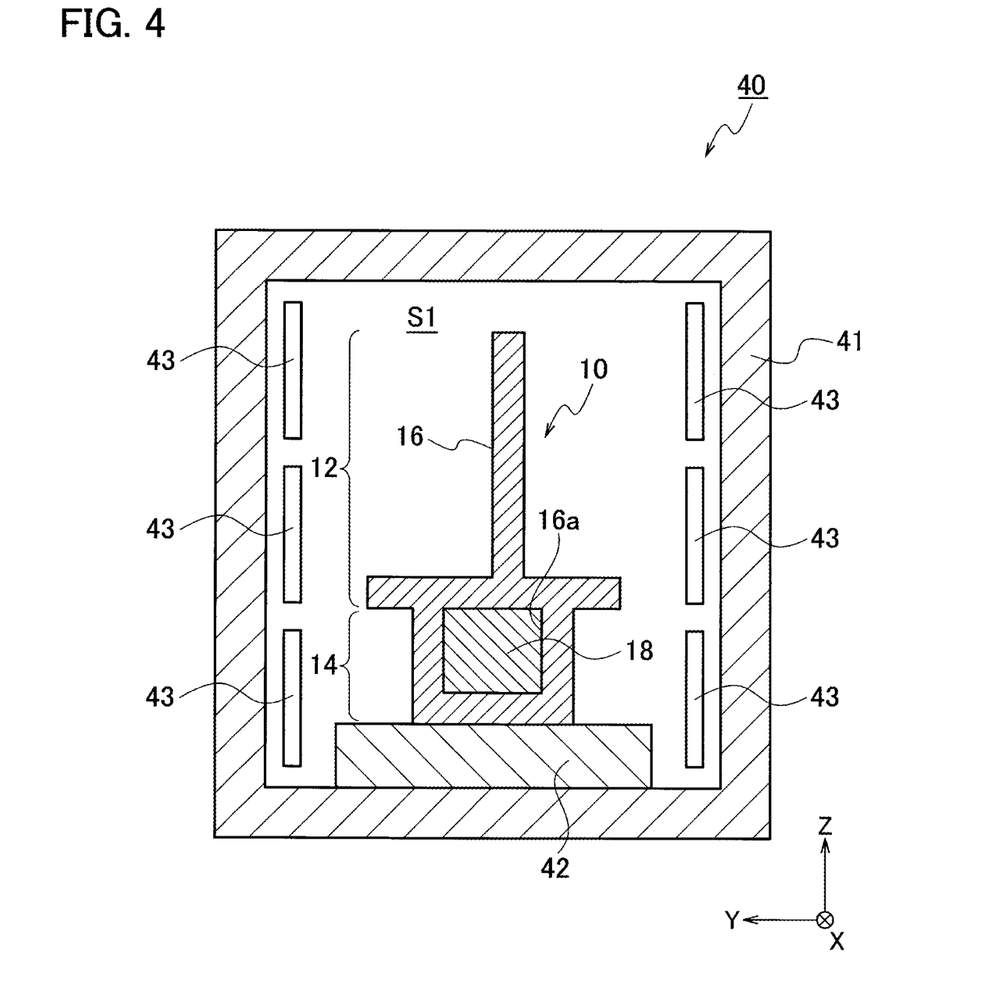
FIG. 4 is a view showing a structure of a hot isostatic pressing device housing the turbine blade.

FIG. 4 is a schematic view showing a configuration of a hot isostatic pressing device (HIP device 40) used in the manufacturing method according to the present embodiment, and showing the intermediate product 16 (the turbine blade 10) housed in the HIP device 40. The HIP device 40 subjects a processed object housed inside to HIP processing. The HIP device 40 includes a pressure container 41, a support table 42, and a heater 43.

The pressure container 41 has an inner space S1 for housing the intermediate product 16 as the processed object. The inner space S1 can be tightly sealed. The pressure container 41 is connected to a gas supply device (not shown). The pressure container 41 leads the inner space S1 to an inert gas atmosphere using inert gas such as argon gas supplied from the gas supply device so as to regulate the inner space S1 at a predetermined pressure. The support table 42 supports the intermediate product 16 housed in the inner space S1. The heater 43 heats the inner space S1 to a predetermined temperature.

Next, a processing process using the HIP device 40 is described below.

The intermediate product 16 removed from the three-dimensional fabrication device 1 after the three-dimensional fabrication process shown in FIG. 3C is mounted on the support table 42 and housed in the pressure container 41 as shown in FIG. 4. The HIP device 40 starts the HIP processing under a predetermined temperature and pressure. The powder material $P_R$, which is metal powder material, is preferably processed at a temperature in a range of 1000° C. to 1300° C. and a pressure of 100 MPa or higher.

The part corresponding to the blade portion 12 of the intermediate product 16 has been densified in the three-dimensional fabrication process. This further increases the density of the part subjected to the HIP processing. The metallic structure of the part corresponding to the blade portion 12 is thus changed to have a uni-directional solidified structure or a single crystal structure, or any equivalent structure.

While the part corresponding to the dovetail portion 14 of the intermediate product 16 has been densified at the outer circumference in the three-dimensional fabrication process, the powder material $P_R$ still remains in the inner region 16a at the beginning of the HIP processing. The powder material $P_R$ in this state in the inner region 16a subjected to the HIP processing is then sintered. The powder material $P_R$ is modified to a joined portion 18 having a high density. The metallic structure of the part corresponding to the dovetail portion 14 is thus to have an isometric structure or an equivalent structure.

The intermediate product 16 subjected to the HIP processing process is thus entirely densified to increase the density, so as to manufacture the turbine blade 10 accordingly.

When the part corresponding to the dovetail portion 14, for example, is subjected to the HIP processing with the powder material $P_R$ remaining in the inner portion, the outer circumference of the corresponding part might contract. In the three-dimensional fabrication process, the control unit 4 preferably generates the slice data and the like while preliminarily taking account of the contracting amount in the corresponding part.

Next, the advantageous effects according to the present embodiment are described below.

The method of manufacturing the metal member including the first part and the second part according to the present embodiment includes the first fabrication process and the second fabrication process. The first fabrication process fabricates the first part through the three-dimensional metal stack fabrication by the powder bed method. The second fabrication process fabricates the outer circumference of the second part through the three-dimensional metal stack fabrication by the powder bed method, and sinters the metallic powder remaining in the inner portion of the second part by the hot isostatic pressing so as to fabricate the second part.

The method of manufacturing the metal member according to the present embodiment can vary the metallic structure depending on the first part and the second part composing the single metal member so as to ensure the respective properties required. In particular, the manufacturing method can vary the crystal structure of the respective parts not only to have the uni-directional solidified structure or the single crystal structure or any equivalent crystal structure, but also to have the isometric structure or any equivalent crystal structure, so as to expand the possibility of the properties to have.

When the second part having a greater thickness, as in the case of the dovetail portion 14 of the turbine blade 10 as illustrated above, is entirely fabricated only by the three-dimensional metal stack fabrication, the fabrication time increases, which may increase the fabrication cost. The manufacturing method according to the present embodiment thus uses the three-dimensional metal stack fabrication only for the outer circumference of the second part, so as to decrease the fabrication time to reduce the cost, as compared with the case of fabricating the entire second part only by the three-dimensional metal stack fabrication.

As used herein, the phrase "the metal member including the first part and the second part" is not limited to the metal member composed of the two parts. The present embodiment can be applied to a case of the metal member including three or more parts, each subjected to either the first fabrication process or the second fabrication process, when including at least two or more of the parts required to have different properties.

The manufacturing method according to the present embodiment executes the first fabrication process and the second fabrication process independently of each other to fabricate the corresponding parts of the metal member, and does not limit the order of the first fabrication process and the second fabrication process. For example, the entire second part is fabricated by the second fabrication process, and the first part is then fabricated on the second part by the first fabrication process, so as to manufacture the metal member (modified example A of the present embodiment) accordingly. This manufacturing method can be applied to a case in which the first part does not need to be subjected to the HIP processing for increasing the density, for example. In addition, the three-dimensional metal stack fabrication by the powder bed method used in each of the first fabrication process and the second fabrication process may employ different kinds of means. For example, the first fabrication process uses the three-dimensional fabrication device by means of the electron beam as illustrated with reference to FIG. 2, while the second fabrication process may use a three-dimensional fabrication device by means of a laser, as illustrated below, different from the first fabrication process.

The method of manufacturing the metal member including the first part and the second part according to the present embodiment also includes the three-dimensional fabrication process of fabricating the first part and the outer circumference of the second part through the three-dimensional metal stack fabrication by the powder bed method. The manufacturing method further includes, after the three-dimensional fabrication process, the processing process of sintering the metallic powder remaining in the inner portion of the second part by the hot isostatic pressing.

The method of manufacturing the metal member according to the present embodiment achieves the effects equivalent to the manufacturing method described above including the first fabrication process and the second fabrication process.

The manufacturing method including the first fabrication process and the second fabrication process is illustrated above with the case of performing the respective fabrication processes for fabricating the corresponding parts of the metal member independently of each other. With respect to this (the modified example A described above), the manufacturing method according to the present embodiment performs the processing process by the hot isostatic pressing after the series of the three-dimensional fabrication steps by the three-dimensional metal stack fabrication. The present embodiment thus can manufacture the metal member efficiently, so as to particularly contribute to a reduction in the fabrication time.

The method of manufacturing the metal member according to the present embodiment leads the first part to have the directional solidified structure or the single crystal structure, and leads the second part to have the isometric structure.

The method of manufacturing the metal member according to the present embodiment enabling the material included in the first part to have the directional solidified structure or the single crystal structure, is thus effective particularly when the first part needs to have the creep properties. The manufacturing method enabling the material included in the second part to have the isometric structure is thus effective particularly when the second part needs to have the fatigue properties.

As used herein, the term "directional solidified structure" encompasses a case presumed to entirely have a uniform direction while actually having several solidification directions, in addition to the uni-directional solidified structure having the uniform solidification direction.

The method of manufacturing the metal member according to the present embodiment manufactures the metal member which is the turbine blade 10. The first part corresponds to the blade portion 12 of the turbine blade 10. The second part corresponds to the dovetail portion 14 (the blade base portion) of the turbine blade 10.

As described above, the blade portion 12 of the turbine blade 10 particularly needs to have the creep properties, and the dovetail portion 14 of the turbine blade 10 particularly needs to have the fatigue properties. The method of manufacturing the metal member according to the present embodiment can manufacture the turbine blade 10 ensuring the respective properties required while achieving the effects described above.

The above embodiment has been illustrated with the three-dimensional fabrication device 1 which is the three-dimensional metal stack fabrication device by the powder bed method using the electron beam. The three-dimensional fabrication device used in the present disclosure is not limited to this, and may be a three-dimensional metal stack fabrication device by the powder bed method using a laser. Examples of three-dimensional fabrication devices using a laser include a device by means of selective laser melting (SLM) and a device by means of selective laser sintering (SLS). The three-dimensional fabrication device using a laser does not necessarily lead the chamber used for the fabrication to be in a vacuum state, and the chamber is only required to be in an inert gas atmosphere such as an argon gas atmosphere. The three-dimensional fabrication device using a laser does not necessarily execute the provisional heating. While the above embodiment has been illustrated with the case of fusing the powder material P so as to be solidified, the method is not limited to this case, and may be applied to a case of sintering the powder material P so as to be solidified.

The above embodiment has been illustrated with the turbine blade 10 as the metal member to be manufactured by the manufacturing method. The present disclosure can be applied to a method of manufacturing any metal member required to have different properties depending on parts. For example, the present disclosure may be applied to a method of manufacturing a shaft and a disc wheel of a turbine for a turbocharger.

It should be understood that the present disclosure includes various embodiments which are not disclosed herein. Therefore, the scope of the present disclosure is defined only by the matters according to the claims reasonably derived from the description above.

What is claimed is:

1. A method of manufacturing a turbine blade, the method comprising:
    fabricating an intermediate part that includes a blade portion and a dovetail portion using a three-dimensional metal stack fabrication by a powder bed method that converts a metallic powder from a powdered state to a bonded state to form the intermediate part, wherein the fabricating forms an inner sealed region in the dovetail portion that contains the metallic powder in the powdered state; and forming the turbine blade by sintering the metallic powder in the inner sealed region of the dovetail portion of the intermediate part using hot isostatic pressing, wherein the hot isostatic pressing converts the metallic powder in the inner sealed region of the dovetail portion from the powdered state to the bonded state.

2. The method of manufacturing the turbine blade according to claim 1, wherein:

the blade portion has a crystal structure which is either a directional solidified structure or a single crystal structure; and the dovetail portion has a crystal structure which is an isometric structure.

3. The turbine blade made by the method of manufacturing according to claim 1.

4. The turbine blade according to claim 3, wherein:

the blade portion has a crystal structure which is either a directional solidified structure or a single crystal structure; and the dovetail portion has a crystal structure which is an isometric structure.

* * * * *